United States Patent
Wood et al.

(10) Patent No.: US 10,245,719 B2
(45) Date of Patent: Apr. 2, 2019

(54) TELESCOPING UTILITY LINE POLE

(71) Applicant: Utility Solutions, Inc., Hickory, NC (US)

(72) Inventors: Eugene H. Wood, Hickory, NC (US); Matthew G. Nolte, Hickory, NC (US)

(73) Assignee: UTILITY SOLUTIONS, INC., Hickory, NC (US)

( * ) Notice: Subject to any disclaimer, the term of this patent is extended or adjusted under 35 U.S.C. 154(b) by 0 days.

(21) Appl. No.: 14/595,249

(22) Filed: Jan. 13, 2015

(65) Prior Publication Data

US 2016/0199973 A1    Jul. 14, 2016

(51) Int. Cl.
B25G 1/04    (2006.01)
H02G 1/02    (2006.01)

(52) U.S. Cl.
CPC .............. B25G 1/04 (2013.01); H02G 1/02 (2013.01); *Y10T 16/473* (2015.01)

(58) Field of Classification Search
CPC .. B62B 5/065; B62B 5/06; B25G 1/04; B25G 1/046; Y10T 16/473
USPC ................................... 16/429, 427
See application file for complete search history.

(56) References Cited

U.S. PATENT DOCUMENTS

| | | | | |
|---|---|---|---|---|
| 3,380,097 A * | 4/1968 | Pharris | ............... | B05C 17/0205 15/145 |
| 3,980,409 A * | 9/1976 | Turner | ............... | B25G 1/04 248/188.5 |
| 4,047,821 A * | 9/1977 | Hoke | ............... | B25G 1/04 24/265 B |
| 4,135,274 A * | 1/1979 | Freeman | ............... | A45D 34/04 15/144.4 |
| 5,313,735 A * | 5/1994 | Latouche | ............... | A01K 87/08 16/427 |
| 5,410,778 A * | 5/1995 | Langevin | ............... | E05F 11/10 16/429 |
| 5,593,196 A | 1/1997 | Baum et al. | | |
| 6,865,776 B2 * | 3/2005 | Spinelli | ............... | B25G 1/04 16/110.1 |
| 6,875,917 B1 * | 4/2005 | Wood | ............... | H02G 1/02 174/38 |
| 9,649,759 B2 * | 5/2017 | Ubeto | ............... | A46B 15/0071 |
| 2003/0233718 A1 * | 12/2003 | Heathcock | ............... | B25G 1/04 15/144.4 |
| 2004/0128796 A1 * | 7/2004 | Ta | ............... | B05C 17/0205 16/427 |
| 2006/0288508 A1 * | 12/2006 | Knopow | ............... | A47L 13/24 15/144.1 |

(Continued)

*Primary Examiner* — Emily M Morgan
(74) *Attorney, Agent, or Firm* — Trego, Hines & Landenheim, PLLC

(57) ABSTRACT

A telescoping utility line pole is disclosed. The pole includes an outer pole section configured to be held in the hand of a user and having an inner bore defined by an inner surface and an inner pole section configured to slide within the bore of the outer pole section. The outer pole section includes a plurality of grooves defined by a plurality of raised sections positioned around a circumference of the inner surface. The inner pole section includes a plurality of lugs positioned on a distal end of the inner pole section. The plurality of lugs and plurality of grooves are keyed to each other. When the plurality of lugs are aligned with the plurality of grooves, the inner pole section is permitted to engage the outer pole section for use by the user.

17 Claims, 7 Drawing Sheets

(56) References Cited

U.S. PATENT DOCUMENTS

| | | | | |
|---|---|---|---|---|
| 2007/0163065 A1* | 7/2007 | Chang | ............... | B25G 1/04 |
| | | | | 15/144.4 |
| 2008/0168627 A1* | 7/2008 | Lai | ............... | A63C 11/221 |
| | | | | 16/429 |
| 2010/0122949 A1* | 5/2010 | Van Der Meijden | .... | B25G 1/04 |
| | | | | 210/167.19 |
| 2015/0048235 A1* | 2/2015 | Shereyk | ............... | B25G 1/01 |
| | | | | 248/634 |
| 2015/0202766 A1* | 7/2015 | Light | ............... | B25G 1/04 |
| | | | | 16/429 |
| 2016/0144499 A1* | 5/2016 | Ubeto | ............... | B25G 1/04 |
| | | | | 15/144.4 |

* cited by examiner

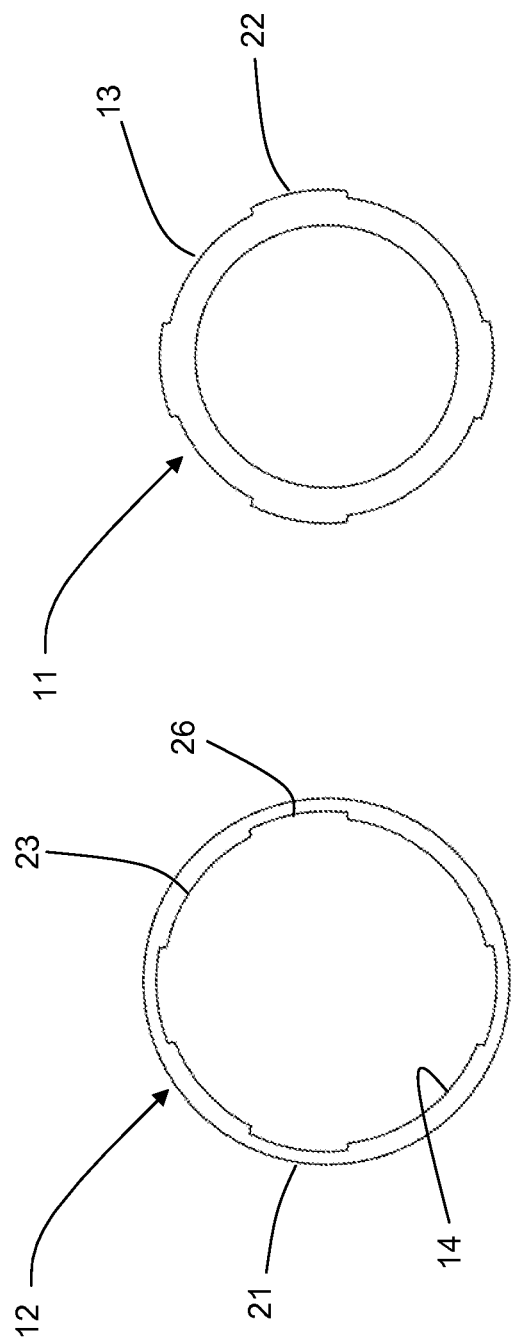

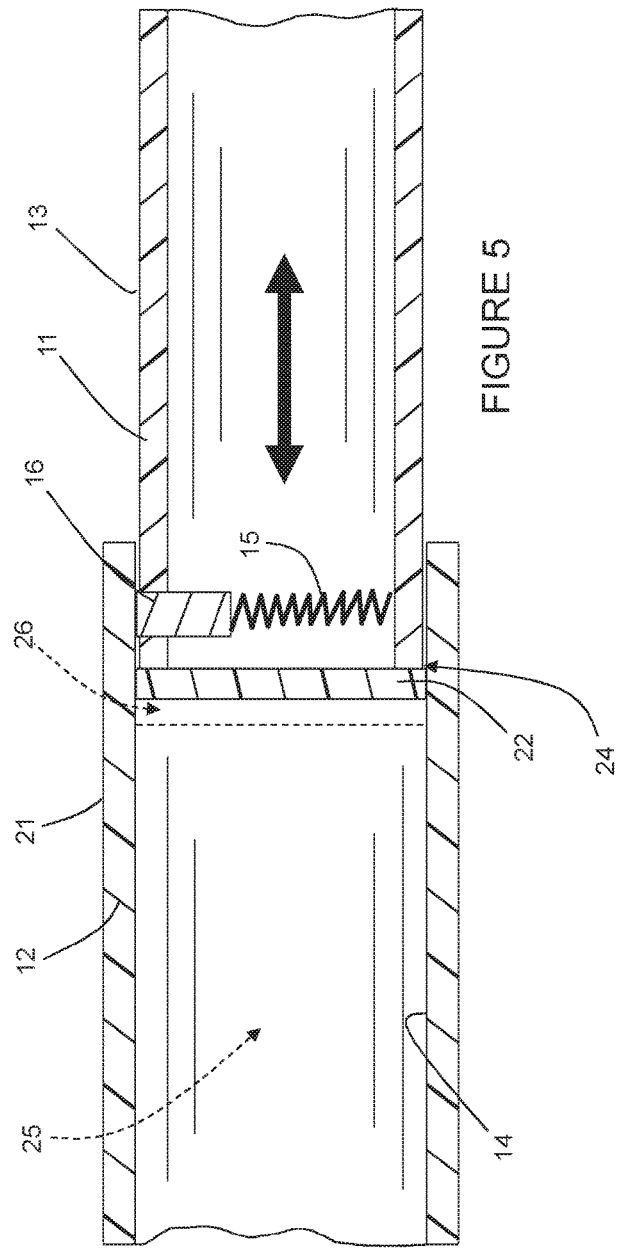
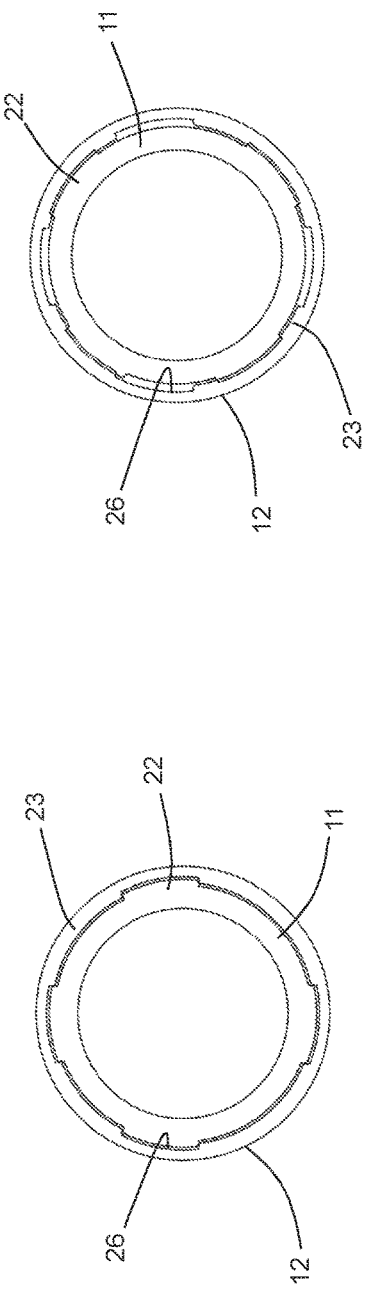

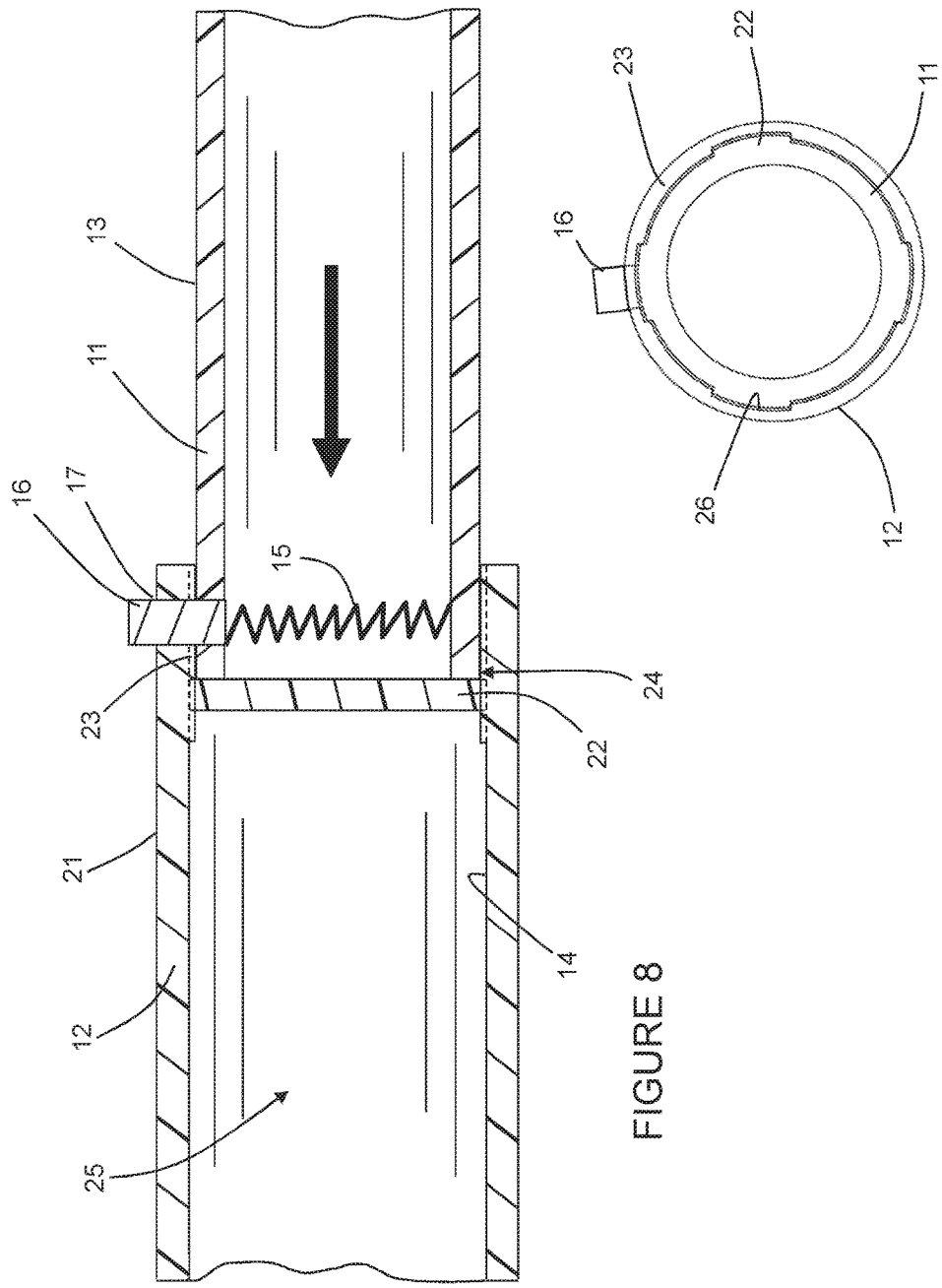

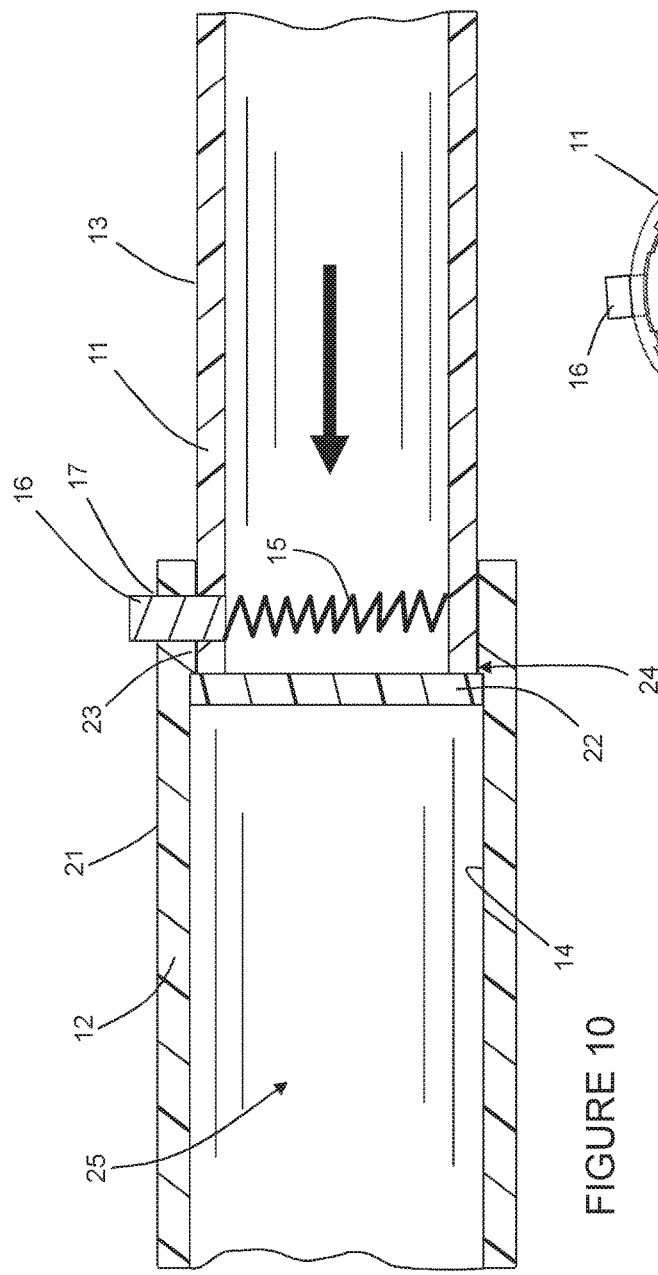
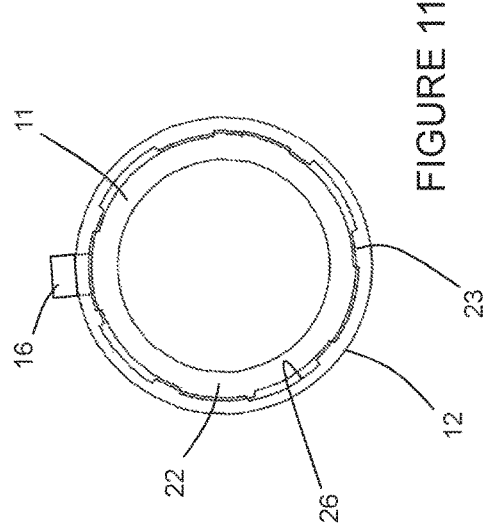
FIGURE 10
FIGURE 11

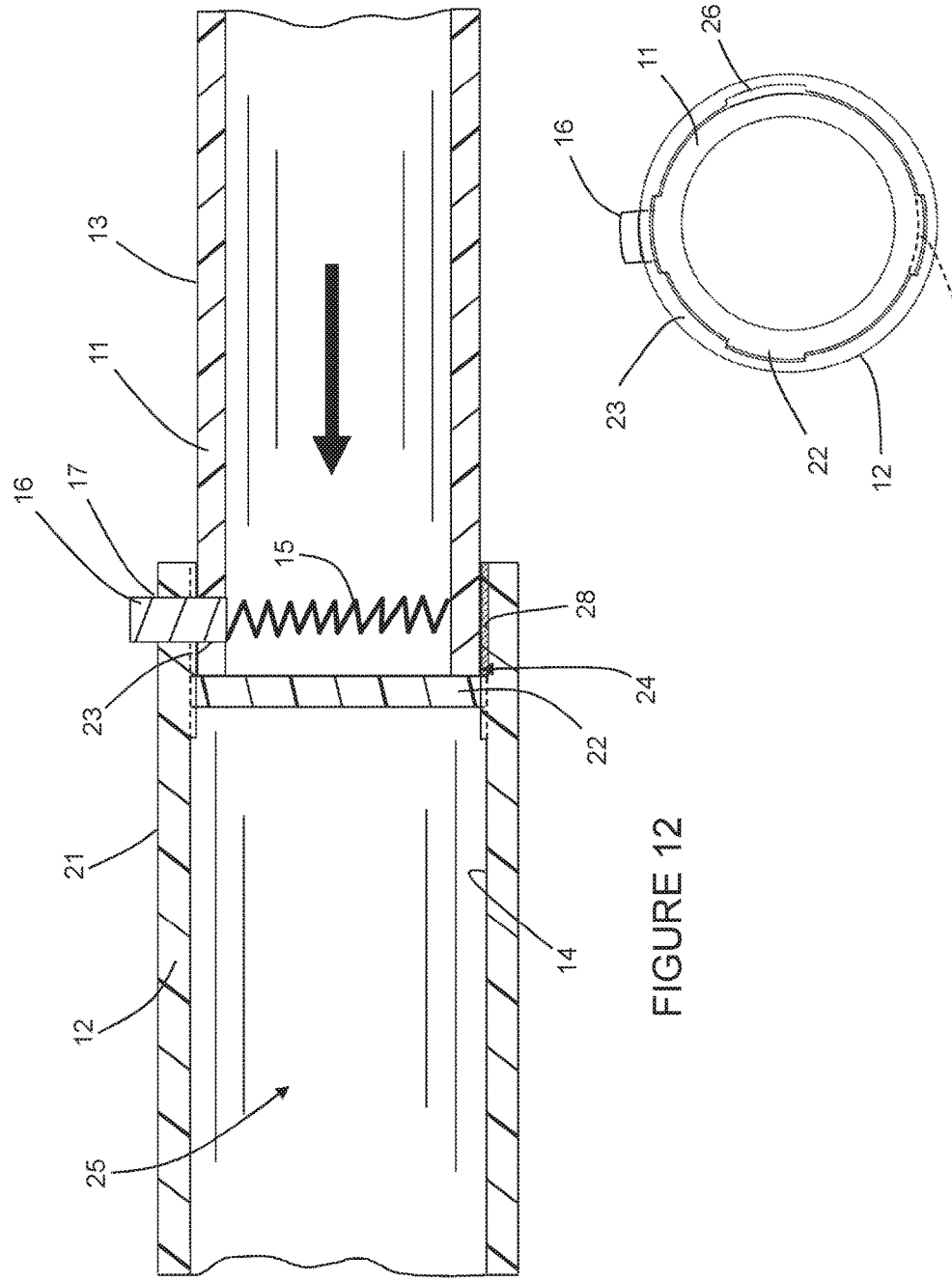

TELESCOPING UTILITY LINE POLE

BACKGROUND OF THE INVENTION

The present invention relates generally to portable extension poles. In more specific aspects, the present invention relates to portable poles used in the electrical distribution system field and methods associated therewith.

The accessibility of electrical power distribution lines varies substantially because the lines are installed both above ground at various elevations and below ground in underground electric power distribution systems. As a result of such a highly diverse and non-uniform manner in which the electrical power distribution lines are positioned and mounted, the access distances between the electrical power distribution lines and the maintenance personnel vary substantially. For example, an above ground electrical power distribution line may be 10 feet or more from the maintenance person thus requiring a pole of at least 10 feet in length in order to reach the line. On the other hand, a below ground electrical power distribution line may be only 5 feet or less from the maintenance person, thus requiring a much shorter pole than would be required for the above ground scenario. In order to be properly prepared under such highly diverse and non-uniform conditions, maintenance personnel have been typically provided telescoping poles (sticks) or a selection of poles of varying lengths in order to properly accomplish various tasks without being required to go back to home-base to obtain a properly sized portable electrical power distribution line pole.

Telescoping poles are well known in the art and have been used for a great number of fields including the electrical power distribution field as one methodology in meeting the needs of the maintenance personnel faced with the possibility of such highly diverse and non-uniform reach distances. The use of telescoping poles is often preferred over the use of various non-telescoping or fixedly sized poles, except in certain exceptions some of which are described below, as they tend to conserve space. The telescoping poles are generally constructed from a plurality of individual telescoping sections that are generally relatively short in length and circular in cross section. By their nature, the individual telescoping sections fit one inside the other when not in use, i.e., an inner pole is disposed within an outer pole having a larger diameter than that of the inner pole. Such telescoping-type poles generally permit a selected number of sections to be extended to provide the maintenance personnel a pole of the required length.

An important feature of telescoping poles is the ability to lock individual sections of the pole at a desired telescoped extension length by means of a locking pin, button, screw, or other such fastener. Thus, the individual sections of the telescoping poles typically include a connector to lock an internal pole within the outer pole, locking select individual sections together to permit the extension of the individual sections and selective adjustment of the overall length of the telescoping pole. For example, each of the individual sections can have a spring-biased button which passes through a hole formed in an adjacent outer cylindrical section. When the hole and the button engage, the pole is mechanically locked into position and can be released by manual pressure on the button.

The means for locking the individual sections of the telescoping pole can, however, be problematic. For example, when a user tries to extend or retract individual sections of the telescoping pole, the inner pole sections often tend to rotate with respect to an adjacent outer pole segment. This rotation typically results in a misalignment of the button of the inner pole section with the corresponding hole in the adjacent outer pole section which prevents engagement of the hole with the button. The user typically cannot see the button of the inner pole section and must radially twist the two pole sections relative to each other to "feel" for the button in order to align the button with the hole of the adjacent outer pole section until engagement occurs. This problem is exacerbated when trying to retract all of the pole sections such that a single button engages each of the holes of corresponding adjacent outer pole sections. The user must successively align the button on the innermost pole section with holes in each of the outermost pole sections which then also must align with each other.

In addition to misalignment, often times while trying to "feel" for the button, the inner pole section is inadvertently disengaged from the outer pole section, resulting in the individual having to reconnect the two pole sections. This reconnection can be very difficult or even impossible when the inner pole section is hanging from a power transmission line.

Applicant has, therefore, recognized a need for a telescoping pole for use with electrical power distribution lines that provides alignment indicators on each pole section that align with each other to further enhance the ease of alignment of the respective telescoping pole sections during both extension and retraction. Applicant has also recognized a need for a telescoping pole for use with electrical power distribution lines that prevents an inner pole section from disengaging an outer pole section when the button disengages the hole in the outer pole section.

BRIEF SUMMARY OF THE INVENTION

These and other shortcomings of the prior art are addressed by the present invention, which provides a telescoping pole for use with electrical power distribution lines that aids an individual in alignment of the inner and outer pole sections and that prevents separation of the inner pole section from the outer pole section when the button disengages the hole in the outer pole section.

According to an aspect of the invention, a telescoping utility line pole includes an outer pole section configured to be held in the hand of a user and having an inner bore defined by an inner surface and an inner pole section configured to slide within the bore of the outer pole section. The outer pole section includes a plurality of grooves defined by a plurality of raised sections positioned around a circumference of the inner surface. The inner pole section includes a plurality of lugs positioned on a distal end of the inner pole section. The plurality of lugs and plurality of grooves are keyed to each other. When the plurality of lugs are aligned with the plurality of grooves, the inner pole section is permitted to engage the outer pole section for use by the user.

According to another aspect of the invention, a telescoping utility line pole includes an outer pole section having an inner bore defined by an inner surface and a plurality of grooves positioned on a distal end of the outer pole section. The plurality of grooves is defined by a plurality of spaced-apart raised sections positioned around a circumference of the inner surface. The pole further includes an inner pole section configured for mating engagement with the outer pole section to form the utility line pole. The inner pole section includes a plurality of lugs positioned on a distal end of the inner pole section. The plurality of lugs is configured for mating engagement with the plurality of grooves to permit the inner pole section to engage the outer pole section. The plurality of grooves and the plurality of lugs are keyed to each other such that when the plurality of lugs and plurality of grooves are in a first position, the plurality of lugs align with the plurality of grooves to permit the inner pole section to slide into engagement with or slide out of engagement with the outer pole section; and when the plurality of lugs and plurality of grooves are in a second position, the plurality of lugs are misaligned with the plurality of grooves and the plurality of raised sections interfere with the plurality of lugs to prevent the inner pole section from sliding into and out of engagement with the outer pole section.

According to another aspect of the invention, a method of using a telescoping utility line pole includes the steps of providing a telescoping utility line pole having an outer pole section having a plurality of grooves defined by a plurality of raised sections positioned around a circumference of the inner surface and an inner pole section having a plurality of lugs positioned on a distal end of the inner pole section. The method further includes the steps of assembling the telescoping utility line pole and using the telescoping utility line pole. The step of assembling includes the steps of aligning the plurality of lugs with the plurality of grooves, pushing the inner pole section inwardly into the outer pole section, and mechanically locking the inner pole section and outer pole section together.

BRIEF DESCRIPTION OF THE DRAWINGS

The subject matter that is regarded as the invention may be best understood by reference to the following description taken in conjunction with the accompanying drawing figures in which:

FIG. 3 is an end view of an outer pole section of the telescoping utility line pole of FIG. 1;

FIG. 4 is an end view of an inner pole section of the telescoping utility line pole of FIG. 1;

FIG. 5 is a cross-sectional view of the telescoping utility line pole of FIG. 1 when the inner pole section is permitted to engage or disengage the outer pole section;

FIG. 6 shows lugs of the inner pole section of FIG. 4 aligned with grooves of the outer pole section of FIG. 3;

FIG. 7 shows the lugs of the inner pole section of FIG. 4 misaligned with the grooves of the outer pole section of FIG. 3;

FIG. 8 is a cross-sectional view of the telescoping utility line pole of FIG. 1 according to an embodiment of the invention;

FIG. 9 is an end view of the telescoping utility line pole of FIG. 8 showing the inner and outer pole sections mechanically locked;

FIG. 10 is a cross-sectional view of the telescoping utility line pole of FIG. 1 according to an alternative embodiment of the invention;

FIG. 11 is an end view of the telescoping utility line pole of FIG. 10 showing the inner and outer pole sections mechanically locked;

FIG. 12 is a cross-sectional view of the telescoping utility line pole of FIG. 1 according to an alternative embodiment of the invention; and FIG. 13 is an end view of the telescoping utility line pole of FIG. 12 showing the inner and outer pole sections mechanically locked.

DETAILED DESCRIPTION OF THE INVENTION

Figure 1:
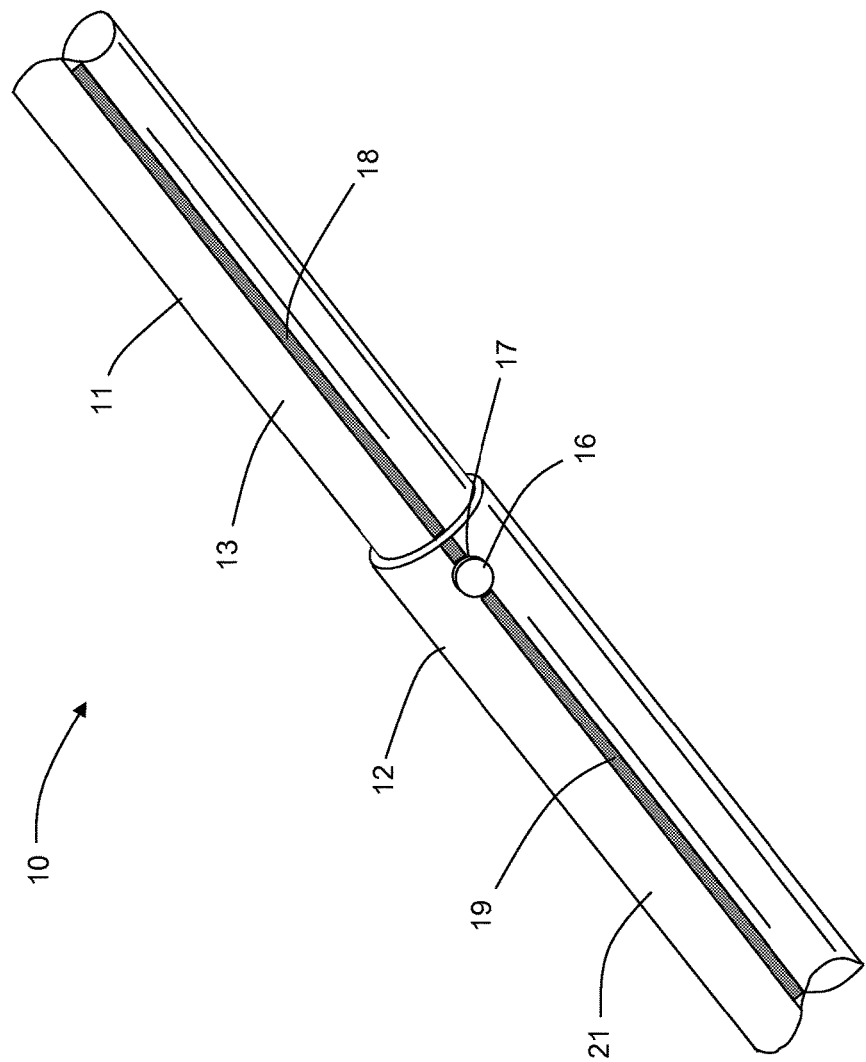
FIG. 1 is a partial perspective view of a telescoping utility line pole according to an embodiment of the invention.
Figure 2:
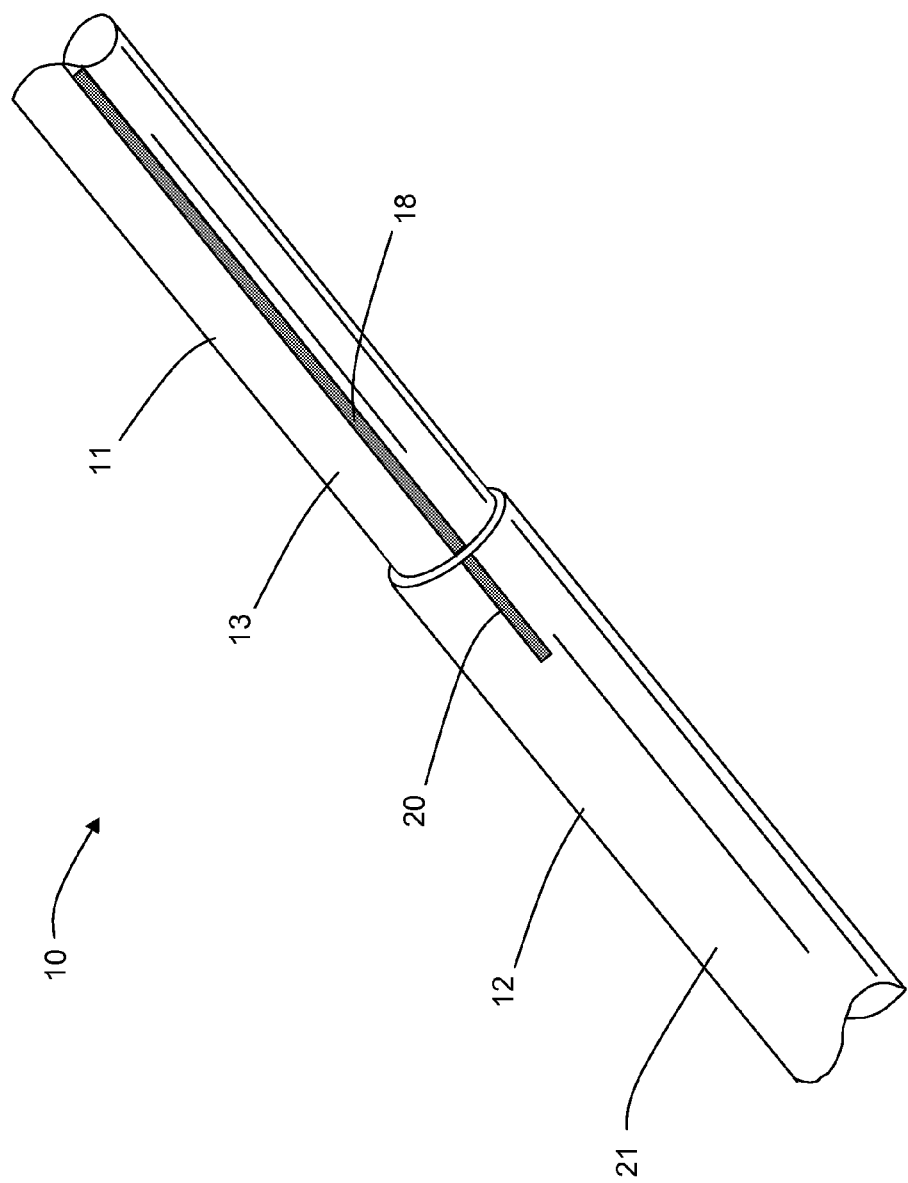
FIG. 2 is a partial perspective view of the telescoping utility line pole of FIG. 1 rotated 180 degrees.

A telescoping utility line pole according to an embodiment of the invention is shown generally in FIGS. 1 and 2 at reference numeral 10. The telescoping pole 10 is adapted to be held in the hand of a user for use in association with electrical power distribution lines. The pole 10 includes an inner pole section 11 and an outer pole section 12. As shown, the inner pole section 11 has a smaller diameter than the outer pole section 12 to allow the inner pole section 11 to slide inside of the outer pole section 12 such that an outer surface 13 of the inner pole section 11 resides adjacent to an inner surface 14 of the outer pole section 12. A locking device, such as spring-biased button 16 (biased outwardly by spring 15), is connected to the inner pole section 11 and extends through an aperture 17 in the outer pole section 12 to mechanically lock the inner and outer pole sections 11, 12 together.

The inner pole section 11 includes an alignment indicator 18 positioned on the outer surface 13 of the inner pole section 11. The indicator 18 extends the length of the inner pole section 11 and is used to provide a visual cue for an individual to align the button 16 with a pre-determined position of the outer pole section 12. The outer pole section 12 includes first and second alignment indicators 19 and 20 positioned on an outer surface 21 of the outer pole section 12. The first alignment indicator 19 extends the length of the outer pole section 12 to provide a visual cue to an individual indicative of where the aperture 17 is located such that when indicator 18 is aligned with indicator 19, the button 16 and aperture 17 are aligned. The second alignment indicator 20 is positioned about 180 degrees from the first alignment indicator 19, FIG. 2, and extends along only a portion of the length of the outer pole section 12. For example, the second indicator 20 may extend twenty-five to fifty percent of the length of the outer pole section 12. It should be appreciated that the second alignment indicator 20 may be positioned at other positions around a periphery of the outer surface 21 of the outer pole section 12. For example, the second indicator 20 may be positioned at 40 degrees, 90 degrees, or 150 degrees from the first indicator 19. Generally, the indicator 20 is positioned to indicate an engagement point, discussed below, for the inner 11 and outer 12 pole sections to engage each other.

Referring to FIGS. 3-4, the outer pole section 12 includes a plurality of grooves 26, FIG. 3, spaced around a circumference of the inner surface 14. As illustrated, the grooves 26 create a plurality of raised sections 23 therebetween. The grooves 26 are keyed to match the spacing of a plurality of lugs 22, FIG. 4, positioned at a distal end 24, see FIGS. 5 and 7, of the inner pole section 11. It should be understood that the term "keyed" as used herein means that the lugs and grooves have the same pattern or spacing and that the spacing between lugs and the spacing between grooves may be of various degrees, i.e., not necessarily equidistant. This is evident in FIGS. 3 and 4.

In general, when the lugs 22 and grooves 26 are in alignment, FIG. 6, the inner pole section 11 is free to slide in and out of the outer pole section 12 to allow the inner pole section 11 to engage the outer pole section 12, FIG. 5. Note that the inner bore 25 of the outer pole section 12 has the same diameter as the grooves 26 to allow the lugs 22 of the inner pole section 11 to slide past the groves and rotate freely within the bore 25. Once the inner pole section 11 is rotated, the lugs 22 and grooves 26 no longer align, FIG. 7, and the raised sections 23 overlap or interfere with the lugs 22, thereby preventing the inner pole section 11 from disengaging the outer pole section 12.

Referring to FIGS. 8 and 9, in one embodiment, the lugs 22 and grooves 26 are in alignment when indicator 18 and indicator 19 are in alignment, FIG. 1; thereby aligning the button 16 with aperture 17. As shown, when the button 16 is engaged with the aperture 17, the lugs 22 are positioned within grooves 26 and between raised sections 23. The lugs 22 engage the raised sections 23 to minimize torsional forces on the button 16. In other words, when a user twists the outer pole section 12, the lugs 22 engage the raised sections 23 to accept the torsional forces being created by the twisting of the outer pole section 12.

To engage the inner and outer pole sections 11, 12, the user aligns indicators 18 and 19 and slides a first portion of the inner pole section 11 into the outer pole section 12. The user depresses the button 16 to allow the inner pole section 11 to slide further into the outer pole section 12 until the button 16 engages the aperture 17, thereby allowing the button 16 to protrude through aperture 17 and lock the inner and outer pole sections 11 and 12 in position. To disengage the inner pole section 11 from the outer pole section 12, the user depresses the button 16 to disengage it from aperture 17 and then pulls the inner pole section 11 outwardly from the outer pole section 12.

In another embodiment, FIGS. 10 and 11, the lugs 22 and grooves 26 are in alignment when indicator 18 is aligned with indicator 20, FIG. 2. Once the lugs 22 and grooves 26 are aligned, the user pushes a first portion of the inner pole section 11 inside of outer pole section 12. The user then depresses the button 16 to allow the inner pole section 11 to slide further into the outer pole section 12 until the lugs 22 and button 16 move past the raised sections 23 and into the bore 25. Once the lugs 22 and button 16 are positioned in the bore 25, the user rotates the inner pole section 11 until indicator 18 aligns with indicator 19, FIG. 1, and then pulls the inner pole section 11 outwardly until the button 16 engages the aperture 17. As illustrated, during rotation of the inner pole section 11, the lugs 22 maintain an interference with the raised sections 23, thereby preventing the inner pole section 11 from disengaging the outer pole section 12 in the event that the user pulls the inner pole section 11 outwardly. Additionally, the lugs 22 and raised sections 23 are positioned such that when the button 16 engages the aperture 17, the lugs 22 are resting against the raised sections 23; thus, the inner pole section 11 cannot be pulled outwardly past the point where the button 16 engages the aperture 17.

To disengage the inner pole section 11 from the outer pole section 12, the user depresses the button 16 to disengage it from the aperture 17 and then pushes the inner pole section 11 inwardly such that the lugs 22 and button 16 are free to rotate within the bore 25. The inner pole section 11 is then rotated until indicator 18 aligns with indicator 20, FIG. 2. The inner pole section 11 is then pulled outwardly until the inner pole section 11 disengages the outer pole section 12.

In a further embodiment, FIGS. 12-13, the lugs 22 and grooves 26 are keyed in an equidistant relationship. One of the grooves 26 includes a stop 28 to prevent the inner pole section 11 from disengaging outer pole section 12 when button 16 is depressed. The stop 28 may be formed by a half-groove 26 (i.e. the groove does not extend to the end of the outer pole section 12) or may be a device inserted into one of the grooves 26 and secured therein by a fastener, adhesive, or any other suitable means. Additionally, the inner pole section 11 may include one fewer lug 22 than the number of grooves 26, or alternatively, the outer pole section 12 may include one additional groove 26 than the number of lugs 22.

Like the embodiment of FIGS. 10 and 11, to engage the inner pole section 11 with outer pole section 12, the user aligns indicator 18 with indicator 20 and pushes the inner pole section 11 inwardly into the outer pole section 12. By aligning indicators 18 and 20 none of the lugs 22 interfere with the stop 28; thereby allowing the inner pole section 11 to slide into the outer pole section 12 such that the lugs 22 are positioned in the inner bore 25 beyond the raised sections 23. Once the lugs 22 are positioned beyond the raised sections 23, the inner pole section 11 may be rotated with respect to the outer pole section 12 until indicator 18 is aligned with indicator 19, thereby aligning the lugs 22 with the grooves 26 and the button 16 with aperture 17. The inner pole section 11 is then pulled outwardly from the outer pole section 12 until the button 16 engages the aperture 17 and a lug 22 engages/interferes with stop 28.

The stop 28 prevents the inner pole section 11 from being pulled out of engagement with outer pole section 12 when the button 16 is depressed. The stop 28 also provides a positive stop so that when the user pulls the inner pole section 11 outwardly, the button 16 engages the aperture 17. In other words, the stop 28 prevents a user from pulling the inner pole section 11 too far. Further, the lugs 22 are positioned between raised sections 23 to provide torsional resistance and against stop 28 to provide pulling resistance. This set-up removes the torsional and pulling stresses from the button 16.

The foregoing has described a utility line pole. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A telescoping utility line pole, comprising:
  (a) an outer pole section having an inner bore defined by an inner surface, the inner surface extending an entire overall length of the outer pole section, the outer pole section having:
    (i) a plurality of raised sections extending radially inward away from the inner surface, and being positioned at a distal end of the outer pole section;
    (ii) the raised sections being positioned around the circumference of the outer pole section with spaces therebetween, wherein the spaces have a defined spacing, and each of the spaces has an open first end and an open second end such that segments of the inner surface extend through the spaces;
    (iii) the raised sections being aligned parallel to a length of the outer pole section, and extending between a first end located at the distal end of the outer pole section and a second end spaced away from the first end a distance less than the overall length of the outer pole section;
  (b) an inner pole section received in the inner bore, the inner pole section having a first outer diameter smaller than a first inner diameter defined by the inner bore and smaller than a second inner diameter defined by the raised sections, the inner pole section having a plurality of lugs having a second outer diameter smaller than the first inner diameter and larger than the second inner diameter, the plurality of lugs being positioned around the periphery of a distal end of the inner pole section, the plurality of lugs having a defined spacing about the periphery of the distal end of the inner pole section equal to the defined spacing of the spaces between the raised sections; and (c) wherein the inner pole section is slidably movable within the inner bore between:

(i) a first position where the majority of the inner pole section is contained in the outer pole section and the lugs are contained in the inner bore and disengaged from the spaces between the raised sections; and (ii) a second position where the majority of the inner pole section is external to the outer pole section, and the lugs are positioned in the spaces between the raised sections.

2. The utility line pole according to claim 1, wherein the inner pole section includes a spring-biased button.

3. The utility line pole according to claim 2, wherein the outer pole section includes an aperture configured to receive the button therein to mechanically lock the inner pole section and outer pole section together.

4. The utility line pole according to claim 3, wherein when the inner and outer pole sections are mechanically locked together by the button being received by the aperture, the plurality of lugs are positioned in the spaces between the plurality of raised sections, thereby creating an interference between the plurality of lugs and the plurality of raised sections to prevent the inner pole section from twisting relative to the outer pole section.

5. The utility line pole according to claim 1, wherein the plurality of lugs and spaces only align in one position.

6. The utility line pole according to claim 1, further including an alignment indicator positioned along a length of the inner pole section to provide a user with a visual cue.

7. The utility line pole according to claim 6, further including a first alignment indicator positioned along a length of the outer pole section to provide a user with a visual cue, wherein when the first alignment indicator is aligned with the alignment indicator positioned on the inner pole section, a spring-biased button connected to the inner pole section is aligned with an aperture in the outer pole section such that the button and aperture mechanically lock the inner and outer pole sections together.

8. The utility line pole according to claim 6, further including a second alignment indicator positioned along a length of the outer pole section to provide a user with a visual cue, wherein when the second alignment indicator is aligned with the alignment indicator positioned on the inner pole section, the plurality of lugs are aligned with the spaces to permit the inner pole section to be pushed into or pulled out of the outer pole section.

9. The utility line pole according to claim 1, further including a spring-biased button positioned on the inner pole section and an aperture positioned on the outer pole section such that the button is configured to engage the aperture to mechanically lock the outer and inner pole sections together, wherein when the button is positioned for engagement with the aperture, the plurality of lugs rest against the plurality of raised sections to prevent the button from being pulled past the aperture.

10. A telescoping utility line pole, comprising:

(a) an outer pole section having an inner bore defined by an inner surface, the inner surface extending an entire overall length of the outer pole section, the outer pole section having:

(i) a plurality of spaced-apart raised sections extending radially inward away from the inner surface, the plurality of spaced-apart raised sections being disposed around a circumference of the inner surface at a distal end of the outer pole section to define spaces therebetween, wherein each of the spaces has an open first end and an open second end such that segments of the inner surface extend through the spaces, the plurality of spaced-apart raised sections extend between a first end located at the distal end of the outer pole section and a second end spaced away from the first end a distanced less than the overall length of the outer pole section;

(b) an inner pole section configured for mating engagement with the outer pole section and having a first outer diameter smaller than a first inner diameter defined by the inner bore and smaller than a second inner diameter defined by the raised sections to form the utility line pole, the inner pole section having a plurality of lugs positioned around a periphery of a distal end of the inner pole section, the plurality of lugs having a second outer diameter smaller than the first inner diameter and greater than the second inner diameter;

(c) wherein the spaces have a defined spacing equal to a defined spacing of the plurality of lugs such that when:

(i) the plurality of lugs and spaces are in a first position, the plurality of lugs align with the spaces and permit the inner pole section to slide axially into engagement with or slide axially out of engagement with the outer pole section; and (ii) the plurality of lugs and spaces are in a second position, the plurality of lugs are misaligned with the spaces and the plurality of raised sections interfere with the plurality of lugs and block the inner pole section from sliding into and out of engagement with the outer pole section.

11. The utility line pole according to claim 10, further including an alignment indicator positioned along a length of the inner pole section to provide a user with a visual cue.

12. The utility line pole according to claim 11, further including a first alignment indicator positioned along a length of the outer pole section to provide a user with a visual cue, wherein when the first alignment indicator is aligned with the alignment indicator positioned on the inner pole section, a spring-biased button connected to the inner pole section is aligned with an aperture in the outer pole section such that the button and aperture mechanically lock the inner and outer pole sections together.

13. The utility line pole according to claim 11, further including a second alignment indicator positioned along a length of the outer pole section to provide a user with a visual cue, wherein when the second alignment indicator is aligned with the alignment indicator positioned on the inner pole section, the plurality of lugs are aligned with the spaces to permit the inner pole section to be pushed into or pulled out of the outer pole section.

14. The utility line pole according to claim 10, further including a spring-biased button positioned on the inner pole section and an aperture positioned on the outer pole section such that the button is configured to engage the aperture to mechanically lock the outer and inner pole sections together, wherein when the button is positioned for engagement with the aperture, the plurality of lugs rest against the plurality of raised sections to prevent the button from being pulled past the aperture.

15. The utility line pole according to claim 10, further including a locking device adapted to mechanically lock the inner and outer pole sections together.

16. The utility line pole according to claim 15, wherein when the inner and outer pole sections are mechanically locked together, the plurality of lugs are positioned in the spaces between the plurality of raised sections, thereby creating an interference between the plurality of lugs and the plurality of raised sections to prevent the inner pole section from twisting relative to the outer pole section.

17. The utility pole according to claim 15, wherein when the inner and outer pole sections are mechanically locked together, the plurality of lugs are positioned in the inner bore adjacent to the second ends of the plurality of raised sections, thereby creating an interference between the plurality of lugs and the plurality of raised sections to prevent the inner pole section from being pulled out of the outer pole section.

* * * * *